United States Patent Office 2,778,832
Patented Jan. 22, 1957

2,778,832

REDUCTION OF CODEINONE TO CODEINE

Marshall D. Gates, Jr., Pittsford, N. Y., assignor to Merck & Co., Inc., Rahway, N. J., a corporation of New Jersey No Drawing. Application June 22, 1954,
Serial No. 438,600

11 Claims. (Cl. 260—285)

This invention relates to a method of reducing ketones to alcohols. More particularly, it is concerned with a new process of reducing ketones having an oxide ring to the corresponding alcohols. Specifically, it is concerned with a novel method of reducing codeinone and codeinone derivatives to codeine and the corresponding codeine derivatives.

This application is a continuation-in-part of my co-pending applications, Serial No. 272,248 filed February 18, 1952, now abandoned and Serial No. 368,516 filed July 16, 1953, now abandoned.

Heretofore, no satisfactory method of reducing codeinone to codeine has been available primarily because of the ease in which the oxide ring of codeinone is opened by the usual reduction methods, both chemical and catalytic. One method of reducing codeinone to codeine by the action of stannous chloride and hydrochloric acid has been reported. However, this method is generally unsatisfactory since the desired product is obtained in only extremely poor yields.

It is an object of this invention to provide a process for reducing ketones having an oxide ring to the corresponding alcohols in good yields. Another object is to provide a method of reducing codeinone and substituted codeinone compounds to the corresponding codeine compounds. Other objects will be apparent from the detailed description of my invention hereinafter provided.

In accordance with this invention, it is now found that the reduction of ketones containing an oxide ring to the corresponding alcohols can be achieved by reacting such ketones with an alkali metal borohydride or an alkali metal aluminum hydride. By this method, it is possible to reduce such ketones to the corresponding alcohol in excellent yields without cleaving the oxide ring. For example, when the reaction is effected with an alkali metal borohydride, solvents such as water, lower aliphatic alcohols, or aqueous lower aliphatic alcohol mixtures are conveniently used as diluents in the reduction. Similarly, in carrying out the reduction of the ketones containing the oxide ring with an alkali metal aluminum hydride, solvents such as tetrahydrofuran, dimethyl formamide, diethyl ether, and the like can be used as diluents for the reduction. Generally, I prefer to effect the reaction by intimately contacting the reactants either dissolved or suspended in the diluent or non-reactive solvent at room temperature until the reduction is complete, although elevated temperatures can be used in cases where the reduction is slow at room temperature.

The process of my invention is particularly valuable for effecting the reduction of alkaloids having an oxide ring, such as codeinone and substituted codeinone compounds to codeine and the corresponding substituted codeine compounds. Thus, by the application of my process, it is possible to reduce codeinone, 1-bromocodeinone, and 14-bromocodeinone and neopinone to codeine, 1-bromocodeine, 14-bromocodeine and neopine respectively. In reducing these codeinone compounds with an alkali metal borohydride, the reaction is most conveniently effected by dissolving or suspending the codeinone compound in a lower aliphatic alcohol, and adding the alkali metal borohydride to the alcoholic solution or suspension either as a solid or in the form of a suspension in a lower aliphatic alcohol. The resulting reaction mixture is then permitted to stand at room temperature for sufficient time to insure completion of the reduction. The codeine compound can be readily recovered from the reaction mixture by conventional methods known in the art. Thus, the reduction product can be recovered by direct crystallization from the reaction mixture. Alternatively, the product may be recovered by diluting the reaction mixture with water, adding alkali and extracting the alcohol with a suitable water immiscible solvent such as chloroform and the like.

Pursuant to a further embodiment of my invention, it is found that the reduction of ketones containing an oxide ring to the corresponding alcohols can also be achieved by reacting such ketones with an alkali metal aluminum hydride such as lithium aluminum hydride. Thus, the reduction of codeinone, 1-bromocodeinone, 14-bromocodeinone, and neopinone to codeine, 1-bromocodeine, 14-bromocodeine, and neopine respectively can be effected by intimately contacting the ketone with lithium aluminum hydride. This reduction is conveniently effected by suspending or dissolving the reactants in a suitable non-reactive anhydrous solvent such as an ether, for example, ethyl ether, tetrahydrofuran, and the like.

When the reduction with lithium aluminum hydride is effected under more drastic conditions, for example at higher temperatures, it is possible to replace the bromo-substituent of 1-bromocodeinone with hydrogen in addition to reducing the keto group to a hydroxyl. Thus, by reacting 1-bromocodeinone with lithium aluminum hydride in tetrahydrofuran under reflux until the reaction is complete, it is reduced to codeine directly.

It is indeed surprising and unexpected that an active reducing agent such as the alkali metal borohydrides or the alkali metal aluminum hydrides can be used to effect the reduction of alkaloids containing an oxide ring without at the same time cleaving this oxide ring. It might have been anticipated that such an active reducing agent would also simultaneously cleave the oxide ring.

Further, it is surprising that the reduction of the alkaloids containing an oxide ring with alkali metal borohydrides or alkali metal aluminum hydrides is steriospecific and results in the production of the desired natural form of the alkaloid.

The following examples illustrate specific methods of carrying out the processes of the present invention:

EXAMPLE 1

Codeine from codeinone

A solution of 194 mg. of codeinone, M. P. 185–187° C., in 10 cc. methanol was treated with 0.5 g. of sodium borohydride which had just been suspended in 12 cc. of methanol. The mixture was allowed to stand for one and one-half hours, concentrated to about one-half the original volume and diluted with 10 cc. of 10% sodium hydroxide. The clear colorless solution was heated momentarily to boiling, diluted with water and extracted four times with chloroform. The washed, dried and filtered chloroform extract on concentration left 196 mg. of codeine as a colorless glass which crystallized readily on scratching, M. P. 153–157° C. Recrystallization from dilute methanol gave 173 mg. of pure codeine hydrate, M. P. 157–158.5° C. $[\alpha]_D^{25} = -136°$ (c 2.80, alc.), whose mixed M. P. with authentic codeine hydrate was undepressed.

Its hydrobromide, obtained as colorless needles from water, melted at 151–160° C. with effervescence, resolidified and remelted with extensive decomposition at 273–

278° C., as did both the hydrobromide of authentic codeine and a mixture of the two.

Anal.—Calcd. for $C_{18}H_{21}NO_3 \cdot HBr, 2H_2O$: C, 51.93; H, 6.30; Br, 19.20; $H_2O$, 8.65. Found: C, 52.07; H, 6.24; Br, 18.82; 19.64; $H_2O$, 8.83.

EXAMPLE 2

1-bromocodeine from 1-bromocodeinone

In the same manner as described in Example 1, 101 mgm. of 1-bromocodeinone on treatment with sodium borohydride yielded 101 mgm. of crude 1-bromocodeinone M. P. 158–160.5°, which on crystallization from ethyl acetate gave 72 mg. of pure 1-bromocodeine, M. P. 161–163° C. whose mixed M. P. with authentic 1-bromocodeine was undepressed. Analysis of the methiodide salt, obtained by reacting the 1-bromocodeine with methyliodide:

Calcd.—for $C_{19}H_{23}NO_3BrI$: C, 43.86; H, 4.46. Found: C, 43.89; H, 4.43.

The 1-bromocodeinone may be prepared as described in the Journal of the American Chemical Society, 74, 1109 (1952).

EXAMPLE 3

Reduction of 14-bromocodeinone to 14-bromocodeine

One-half gram of sodium borohydride was added all at once to 1.88 g. of 14-bromocodeinone suspended in 20 cc. of methanol. The reaction was immediate and vigorous, and no attempt to cool it was made. Colorless crystals of product began to separate almost as soon as all the bromocodeinone had dissolved. The mixture was poured into ice water and the solid removed. Yield 1.5 g. The 14-bromocodeine could be recrystallized from chloroform-ether, but the solution turned brown rapidly. The recrystallized material decomposed over a range in the vicinity of 185° C.

14-bromocodeinone may be prepared by treatment of thebaine with bromine in acetic acid as described by Speyer and Sarre, Ber 57, 1404 (1924).

EXAMPLE 4

Preparation of codeine

A mixture of 200 mg. of 1-bromocodeinone, M. P. 202.5–203.5° C., 0.5 g. of lithium aluminum hydride and 30 cc. of carefully purified tetrahydrofuran was refluxed for forty-six hours. After destruction of the excess reagent with ethyl acetate, the mixture was acidified with 2 N hydrochloric acid and extracted with ether. The acid layer was added slowly to a strong potassium hydroxide solution containing Rochelle salt. The resulting alkaline suspension was extracted three times with chloroform, and the chloroform layers were washed, dried, filtered, and concentrated to give 146 mg. of colorless glass, which was converted to its hydrobromide, 131 mg., M. P. 148–160° C., resolidifying, remelting >270° C. Recrystallization of this hydrobromide gave 110 mg., properties essentially unchanged.

This hydrobromide, dissolved in warm water, on treatment with ammonia gave an oil which rapidly crystallized, 70 mg., M. P. 153–156° C. Recrystallization from dilute methanol gave 59 mg., M. P. 156.5–158° C., large prisms, hydrated. Its M. P. was undepressed on admixture with authentic codeine, M. P. 157–158.4° C. crystallized as above, but was strongly depressed by admixture of 1-bromocodeine of M. P. 161–163° C.

EXAMPLE 5

Reduction of 14-bromocodeinone to 14-bromocodeine

A solution of 1.5 g. of sodium borohydride in 10 cc. of water was added to 5 g. of 14-bromocodeinone in 50 cc. of methanol at 0° with stirring over a period of 10 minutes. After an additional 5 minutes at 0° the crystalline 14-bromocodeine was removed by filtration and washed with water. The yield was 3.3 g., M. P. 202 (d.).

EXAMPLE 6

Reduction of neopinone to neopine

A solution of 2 g. of neopinone in 100 cc. of methanol was treated with 5.0 g. of sodium borohydride which had just been suspended in 120 cc. of methanol. The mixture was allowed to stand for one and one-half hours, concentrated to about half the original volume, and diluted with 100 cc. of 10% sodium hydroxide. The resulting aqueous alkaline solution was then diluted with water and extracted four times with chloroform. The washed, dried and filtered chloroform solution was concentrated and the resulting residue dissolved in excess hydrobromic acid to obtain neopine hydrobromide, M. P. 290° C. dec, identical with the melting point of an authentic sample of neopine hydrobromide.

Neopinone, a compound of the formula, employed as the starting material in the foregoing example, can be prepared by catalytically hydrogenating 14-bromocodeinone in the presence of palladium on charcoal as follows:

A solution of 18.8 g. (0.05 mol.) of 14-bromocodeinone in a mixture of 200 cc. of benzene and 70 cc. of methanol containing 4.0 g. of 10% palladium on charcoal was shaken with hydrogen at 25°. The absorption of hydrogen was rapid until one molar equivalent had been taken up, when the absorption practically ceased. The catalyst was removed by filtration and the clear nearly colorless solution was shaken with a cold solution of 7.0 g. of potassium carbonate in 200 cc. of water. The benezene solution of the free base was washed twice with cold, 1% sodium sulfate solution, and then concentrated below 40° under reduced pressure. After the addition of ethyl acetate and ether the neopinone was obtained in the form of nearly colorless fine needles which melted sharply between 118° and 130° depending on the rate of heating $[\alpha]_D^{23°} = -12.1°$ ($CHCl_3$, C=0.873).

Neopinone and a process of preparing this compound are more fully described and claimed in the copending application of Harold Conroy Serial No. 450,231, filed August 16, 1954.

EXAMPLE 7

Reduction of codeinone to codeine

In a manner analagous to Example 4 starting with 200 mg. of codeinone and allowing the reaction mixture to stand at 25–30° C. for about six hours rather than refluxing, codeine, M. P. 156–157° C. can be obtained.

Various changes and modifications in the procedures herein disclosed will occur to those skilled in the art, and to the extent that such changes and modifications are embraced by the appended claims, it is to be understood that they constitute part of my invention.

I claim:

1. The process for reducing a codeinone compound which comprises intimately contacting a codeinone compound with a reducing agent from the group consisting of alkali metal aluminum hydrides and alkali metal borohydrides to produce the corresponding codeine compound.

2. The process for reducing a codeinone to the corresponding alcohol without substantially affecting the oxide ring, which comprises reacting a codeinone with an alkali metal borohydride to produce the corresponding alcohol.

3. The process which comprises intimately contacting codeinone with an alkali metal borohydride to produce codeine.

4. The process which comprises intimately contacting 1-bromocodeinone with an alkali metal borohydride to produce 1-bromocodeine.

5. The process which comprises intimately contacting 14-bromocodeinone with an alkali metal borohydride to produce 14-bromocodeine.

6. The process of claim 2 using sodium borohydride.
7. The process of claim 3 using sodium borohydride.
8. The process of claim 4 using sodium borohydride.
9. The process which comprises intimately contacting 1-bromocodeinone with an alkali metal aluminum hydride to produce 1-bromocodeine.
10. The process of claim 9 using lithium aluminum hydride.
11. The process which comprises heating 1-bromocodeinone with lithium aluminum hydride at elevated temperatures to produce codeine.

References Cited in the file of this patent

UNITED STATES PATENTS

| | | |
|---|---|---|
| 2,674,606 | Levin et al. | Apr. 6, 1954 |
| 2,683,721 | Schlesinger et al. | July 13, 1954 |

OTHER REFERENCES

Ach et al.: Berichte, vol. 36, pp. 3067–73 (1903).
Henry: The Plant Alkaloids (4th Ed. 1949) p. 245.
Small: Chem. of the Opium Alkaloids, Gov't Printing Office 1932, pp. 247 and 363.
Schmid et al.: Helv. Chim. Acta., vol. 33, pp. 863–73 (1950).